United States Patent
Sander et al.

(10) Patent No.: US 7,596,519 B2
(45) Date of Patent: Sep. 29, 2009

(54) SYSTEM AND METHOD FOR FACILITATING OPEN ITEM CLEARANCE

(75) Inventors: Joachim Sander, Heidelberg (DE); Stefan Scheid, Hanhofen (DE); Roman Rura, Mannheim (DE); Dietmar Nowotny, Dielheim (DE)

(73) Assignee: SAP AG, Walldorf (DE)

( * ) Notice: Subject to any disclaimer, the term of this patent is extended or adjusted under 35 U.S.C. 154(b) by 424 days.

(21) Appl. No.: 11/272,964

(22) Filed: Nov. 14, 2005

(65) Prior Publication Data

US 2007/0108266 A1 May 17, 2007

(51) Int. Cl.
*G07B 17/00* (2006.01)
*G06Q 40/00* (2006.01)

(52) U.S. Cl. .......................... 705/30; 705/40
(58) Field of Classification Search ................... 705/30, 705/35–45
See application file for complete search history.

(56) References Cited

U.S. PATENT DOCUMENTS

2004/0172360 A1* 9/2004 Mabrey et al. ................ 705/40
2005/0075979 A1* 4/2005 Leavitt et al. ................. 705/40
2006/0015418 A1* 1/2006 Holmes et al. ................ 705/30
2006/0095373 A1* 5/2006 Venkatasubramanian et al. . 705/40
2007/0156583 A1* 7/2007 Ripp et al. ..................... 705/40

* cited by examiner

*Primary Examiner*—Daniel S Felten
*Assistant Examiner*—William E Rankins
(74) *Attorney, Agent, or Firm*—Finnegan, Henderson, Farabow, Garrett & Dunner, LLP (57) ABSTRACT

Systems and methods are disclosed for assisting a user in clearing payments against vouchers in a financial system. A payment requiring user attention may be displayed to the user in an interface of the financial system. The financial system may automatically suggest at least one voucher to balance the payment. The user may also select at least one voucher to balance the payment from a plurality of available vouchers. If the difference between the payment and the combined total of the selected vouchers equals zero, the financial system may allow the user to clear the payment against the selected vouchers. If the system-suggested vouchers are not the ones the user would choose for clearing the payment, the financial system may allow the user to select vouchers to clear the payment.

21 Claims, 7 Drawing Sheets

FIG. 1

| REFERENCE | PAYMENT REASON | DATE | PAYMENT TYPE | PAYMENT AMOUNT | CURRENCY | REASON FOR REJECTION |
|---|---|---|---|---|---|---|
| POWELL BECTR. | BANK TRANSFER 10/03/2004 TOTAL AMOUNT 4,970 USD | 10/09/2004 | BANK TRANSFER | 4,970.00 | USD | AMOUNT IS NOT MATCHING |
| JACKSON RD. | BANK TRANSFER | 10/09/2004 | BANK TRANSFER | 3,456.56 | USD | AMOUNT IS NOT MATCHING |
| AT&T COMMUNICATION | INVOICES 456/468/471/488 | 09/02/2004 | DIRECT DEBIT | 5,452.10 | USD | MISSING INVOICE NUMBER |
| INCOMING CHECK | CHECK NO. 145265510 | 09/02/2004 | CHECK | 15,132.90 | GBP | AMOUNT IS NOT MATCHING |
| INCOMING CHECK | CHECK NO. 145265289 | 09/02/2004 | CHECK | 12,784.12 | EUR | AMOUNT IS NOT MATCHING |
| GLOBAL LEASING CORP. | MONTHLY RATE SEP. 04 | 09/02/2004 | DIRECT DEBIT | 20,314.00 | EUR | NO OPEN TERMS FOUND |
| INCOMING CHECK | CHECK NO. 145265266 | 09/02/2004 | DIRECT DEBIT | 9,933.87 | USD | AMOUNT IS NOT MATCHING |

SYSTEM AND METHOD FOR FACILITATING OPEN ITEM CLEARANCE

DESCRIPTION OF THE INVENTION

1. Field of the Invention

The field of the invention relates generally to graphic user interfaces in a computer system. More particularly, the field of invention relates to interfaces for facilitating clearance of open items (i.e. invoices) in a financial system of an enterprise.

2. Background Information

Clearing is the financial process that follows the execution of a transaction and culminates with the final and irrevocable exchange of payment and goods or services between parties. Typically, when a transaction is executed, an open position is created in the financial books of a seller, who is to provide goods or services to a buyer. The open position, which is often recorded in the seller's financial system as one or more vouchers, must be balanced by an appropriate payment from the buyer. The balancing of a received payment against its corresponding vouchers, when resulting in a zero difference, indicates the completion of the exchange initiated by the earlier transaction. In response to this completion, the received payment and the corresponding vouchers may be "cleared," for example, from a list of open items in the financial system.

In today's financial systems, the clearing process may generally be performed automatically. As an example, the financial system may use a set of predefined criteria, such as, for example, account information, to match received payments to their corresponding vouchers. If the total amount of the vouchers balances out the total amount of a payment, the financial system may automatically clear the payment without requiring manual input from, for example, an accountant.

Unfortunately, not all clearing may be automatically carried out by the financial system. Situations may arise in which user input may be required before the clearing process may be executed. As an example, a seller may receive payments that are different in amount from the total that is due, for example, because of a discount. When this happens, the financial system will be unable to automatically clear the payment, so a user, such as an accountant, must go through an often tedious exercise of allocating appropriate vouchers from what may be a large pool of available vouchers to balance the payment manually. In such situations, it would be advantageous to provide an improved method and system for assisting the user in the clearing process. More specifically, it would be advantageous to provide a series of intuitive interfaces for aiding the user in the process of matching a payment to the appropriate vouchers.

SUMMARY

Consistent with the principles of the present invention, systems and methods are disclosed for assisting a user in clearing payments against open items (i.e. invoices), which may be displayed as vouchers in a financial system.

In accordance with a financial system consistent with the principles of the present invention, a clearing interface may be provided in which a payment that requires user attention may be displayed. The payment may be displayed, for example, because the financial system was unable to locate appropriate open vouchers against which to clear the payment. To assist the user in manually clearing the payment, the financial system may automatically suggest at least one voucher, which may be, for example, the closest matching vouchers that may be used to balance the payment based on a system evaluation. In some embodiments consistent with the principles of the present invention, the financial system may suggest one or more combinations of vouchers among which the user may, for example, switch to determine the most suitable combination of vouchers to balance the payment.

In combination or as an alternative, the financial system may allow the user to select at least one voucher from a plurality of available vouchers to balance the payment in an interface. As an example, the user may add one or more vouchers from the plurality of available vouchers to a system-suggested combination of vouchers. The user may also remove a voucher from a system-suggested combination, which may be placed back among the plurality of available vouchers.

Consistent with the principles of the present invention, the financial system may allow the user to clear the payment using the at least one system-suggested and/or user selected voucher. As a part of the clearing process, the financial system may allow the user to manipulate an attribute of the at least one voucher. For example, the user may approve a discount associated with a voucher, thereby changing the amount associated with that voucher. A difference between the payment and the at least one voucher intended for clearing the payment may be automatically calculated by the financial system and updated, for example, when a new voucher is added, when a voucher is removed, when the amount of the at least one voucher is changed, or when any other suitable changes affecting the difference take place.

At any time during the preceding clearing process, if the updated difference between the payment and the at least one voucher becomes zero, the financial system may enable the user to clear the payment against the at least one voucher, for example, by enabling a clearing button, which the user may select to cause clearing of the payment consistent with the principles of the present invention.

It is to be understood that both the foregoing general description and the following detailed description are exemplary and explanatory only and are not restrictive of the invention as claimed. The foregoing background and summary are not intended to provide any independent limitations on the claimed invention.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary versions and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

As briefly mentioned above, a financial system may be unable to automatically clear some of the received payments against the available vouchers in the seller's books. This may be due to, for example, the financial system's inability to locate appropriate vouchers to balance out the payments. In such situations, the financial system may solicit user inputs to help clear these payments. In order to bring these unresolved payments to the user's attention, the financial system may display them to the user in a clearing interface such as the one shown in FIG. 1.

Figure 1:
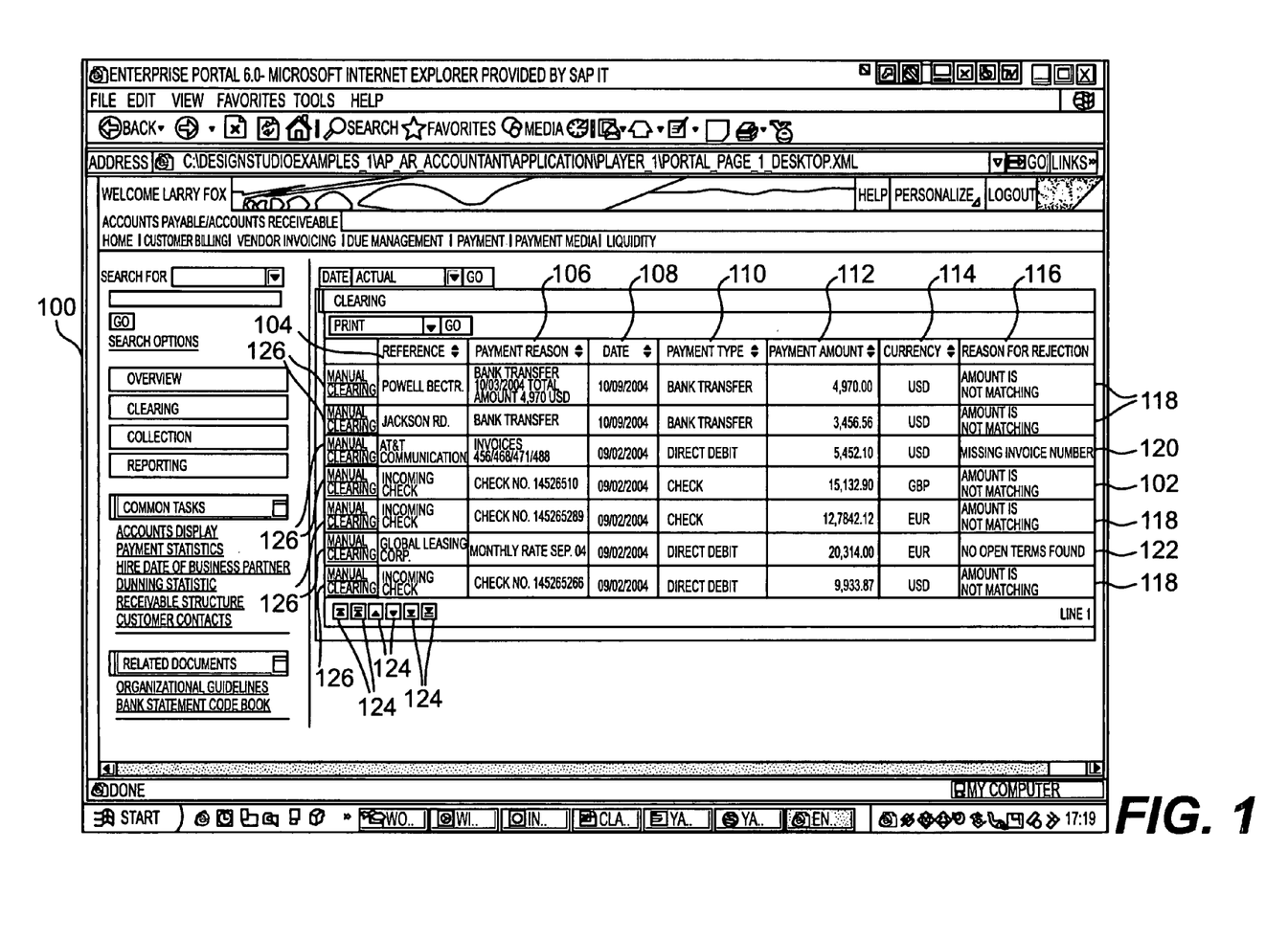
FIG. 1 is an exemplary clearing interface in which payments requiring user attention are displayed in accordance with a system consistent with the principles of the present invention.

FIG. 1 shows an exemplary clearing interface 100 in which payments requiring user attention are displayed in accordance with a system consistent with the principles of the present invention. Clearing interface 100 may include a payment table 102 in which payments that the financial system was unable to clear automatically may be displayed. The payments may be listed chronologically in table 102 or in any other suitable order.

Each payment in table 102 may be displayed with a number of attributes, including, for example, reference 104, which may indicate the associated payer, payment reason 106, date 108, payment type 110, payment amount 112, currency 114, and reason for rejection 116, which may indicate why the financial system was unable to automatically clear the item. As seen in the present example, rejection reasons may include amount is not matching 118. This may indicate that the amount of the payment does not match the amount of the best fitting vouchers identified by the financial system. The rejection reasons may also include missing invoice number 120, no open items found 122, and any other suitable rejection reason. The user may view additional items that are not immediately displayed in table 102 using, for example, scrolling arrows 124. The user may select a particular payment for manual clearing, for example, by selecting link 126 associated with the payment in table 102.

It will be understood that interface 100 is merely illustrative of such a clearing interface. Any other suitable interface may be used without departing from the spirit of the present invention.

Figure 2:
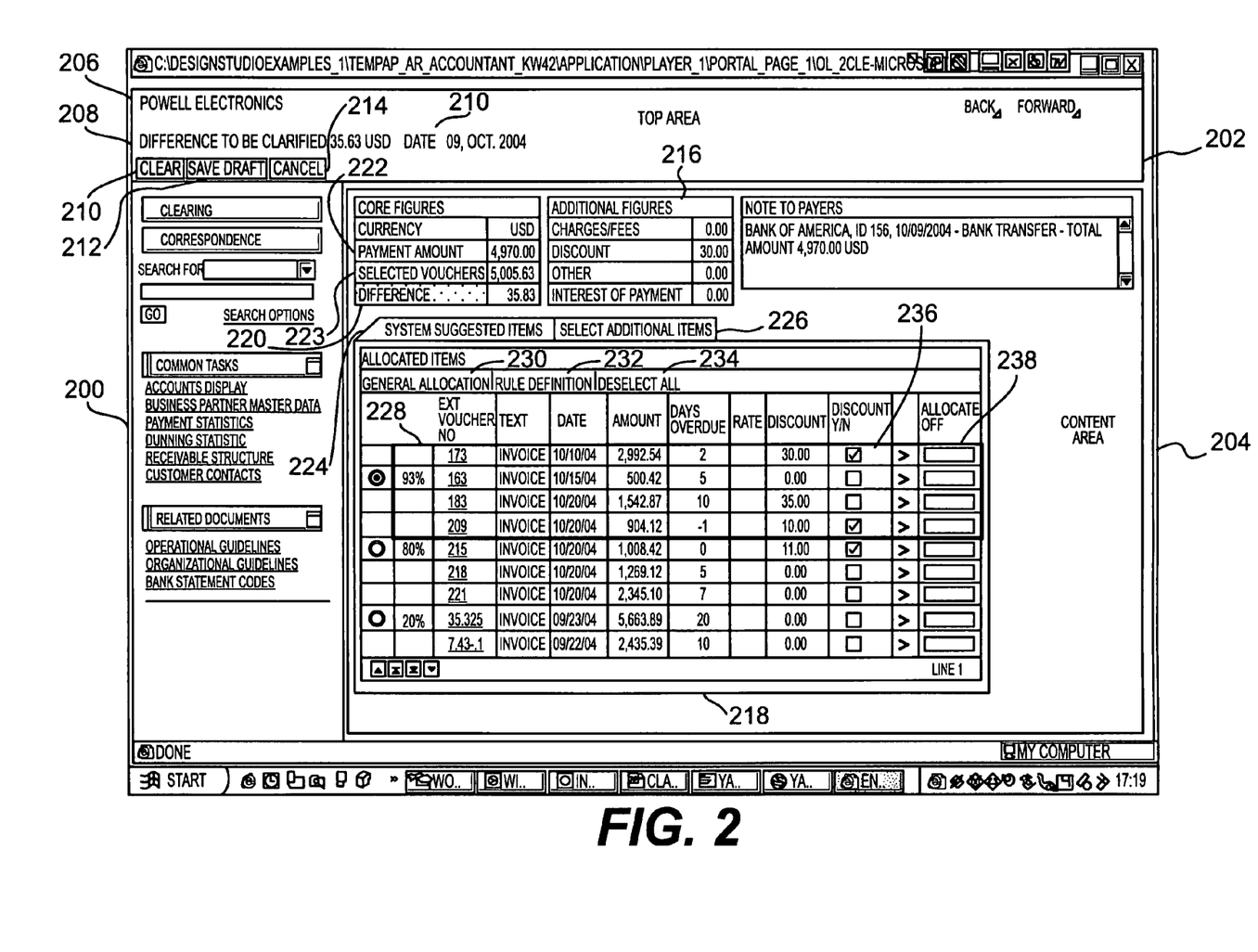
FIG. 2 is an exemplary clearing interface in which system-suggested vouchers for clearing a payment are displayed in accordance with a system consistent with the principles of the present invention.

In response to a user selecting one of the unresolved payments for manual clearing in FIG. 1, an item specific clearing interface, such as interface 200 of FIG. 2, may be displayed. Interface 200 may be divided into two general areas, top area 202 and content area 204. Top area 202 may display a set of brief identity information associated with the payment. This identity information may include the reference or payer name 206, the difference to be clarified or amount paid 208, the date 210, and any other suitable identity information.

Also included in top area 202 may be one or more action buttons 210-214. Clear button 210 may enable the user to clear the payment when appropriate vouchers are found to match and balance out the payment. In a financial system consistent with the principles of the present invention, button 210 may be disabled until the payment is ready to be cleared, for example, when appropriate vouchers are found, which when matched with the payment, results in a zero balance. The enablement of clear button 210 may be controlled by a predefined set of rules, which may additionally take into account user and/or law requirements for clearing. Save draft button 212 may allow a user to save a payment that is not yet ready to be cleared with its allocated vouchers. Cancel button 214 may allow the user to cancel any attempted allocations of vouchers.

Content area 204 may include summary portion 216 and allocation table 218. Summary portion 216 may include vital information concerning both the payment and allocated vouchers for balancing the payment. For example, summary portion 216 may include payment amount 222, voucher amount 223, and difference 220, which may indicate the difference between voucher amount 223 and payment amount 222. Consistent with the principles of the present invention, display characteristics associated with difference 220 may vary to indicate whether the difference has reached a balance of zero. For example, difference 220 may be displayed in red when it has not reached zero. The goal is for the user to allocate appropriate vouchers, for example, in allocation table 218, to offset payment amount 222, thereby reducing difference 220 to zero. When a zero balance is reached, difference 220 may be displayed in green. Because summary information such as payment amount, voucher amount, and difference are automatically calculated and updated by the financial system, for example, based on user allocations of vouchers, summary portion 216 may be made non-modifiable to avoid introducing errors.

As mentioned above, vouchers may be allocated in table 218 to balance the payment. Two tabs may be provided in connection with table 218. Tab 224, which is currently activated in interface 200, may provide the user with various combinations of vouchers, which have been automatically suggested by the financial system to balance the payment. For each combination of vouchers suggested by the financial system, a percentage 228 may be provided to indicate a system estimation of how close it is to balance out the payment.

The user may switch among the suggested combinations of vouchers, for example, using radio buttons associated with the combinations. In the present example, the user has selected the first combination of three system-suggested vouchers. When vouchers are selected, their background in interface 200 may take on a different appearance from the unselected vouchers. Additionally, the financial system may automatically calculate and update difference 220 based on the selected combination. In the present example, the amount of the selected vouchers do not exactly match payment amount 222, leaving a difference of $35.83.

The user may take a number of actions in connection with allocation table 218 while attempting to reduce difference 220 to zero. For example, at an individual voucher level, the user may examine a discount associated with the voucher and decide whether to accept the discount using checkbox 236. The user may also indicate specific allocation of a difference in connection with a particular voucher using, for example, input field 238.

Some additional options 230-234 may be provided in connection with tab 224 of table 218. General allocation 230 may allow the user to generally allocate a difference, for example, as bank charges. Rule definition 232 may enable the user to adjust the rules that govern how the financial system selects vouchers for suggestion. Deselect all 234 may deselect all system-suggested combinations of vouchers.

It will be understood that interface 200 is merely illustrative of such an interface. Any other suitable interface may be used without departing from the spirit of the present invention.

While it may be helpful to provide the user with system-suggested vouchers, sometimes, manual selection of vouchers may be necessary to create the appropriate match for a payment. To accommodate this need, an interface such as interface 300 of FIG. 3, may be provided in accordance with a financial system consistent with the principles of the present invention. The user may access interface 300, for example, by selecting tab 226, shown in FIG. 2, or by using any other suitable interface invoking mechanism. Top area 302 and summary portion 304 of interface 300 may remain the same or substantially similar to top area 202 and summary portion 216 of FIG. 2. Table 218 of FIG. 2, in which system-suggested vouchers are displayed, may be replaced by linked tables 306 and 308 in interface 300.

Figure 3:
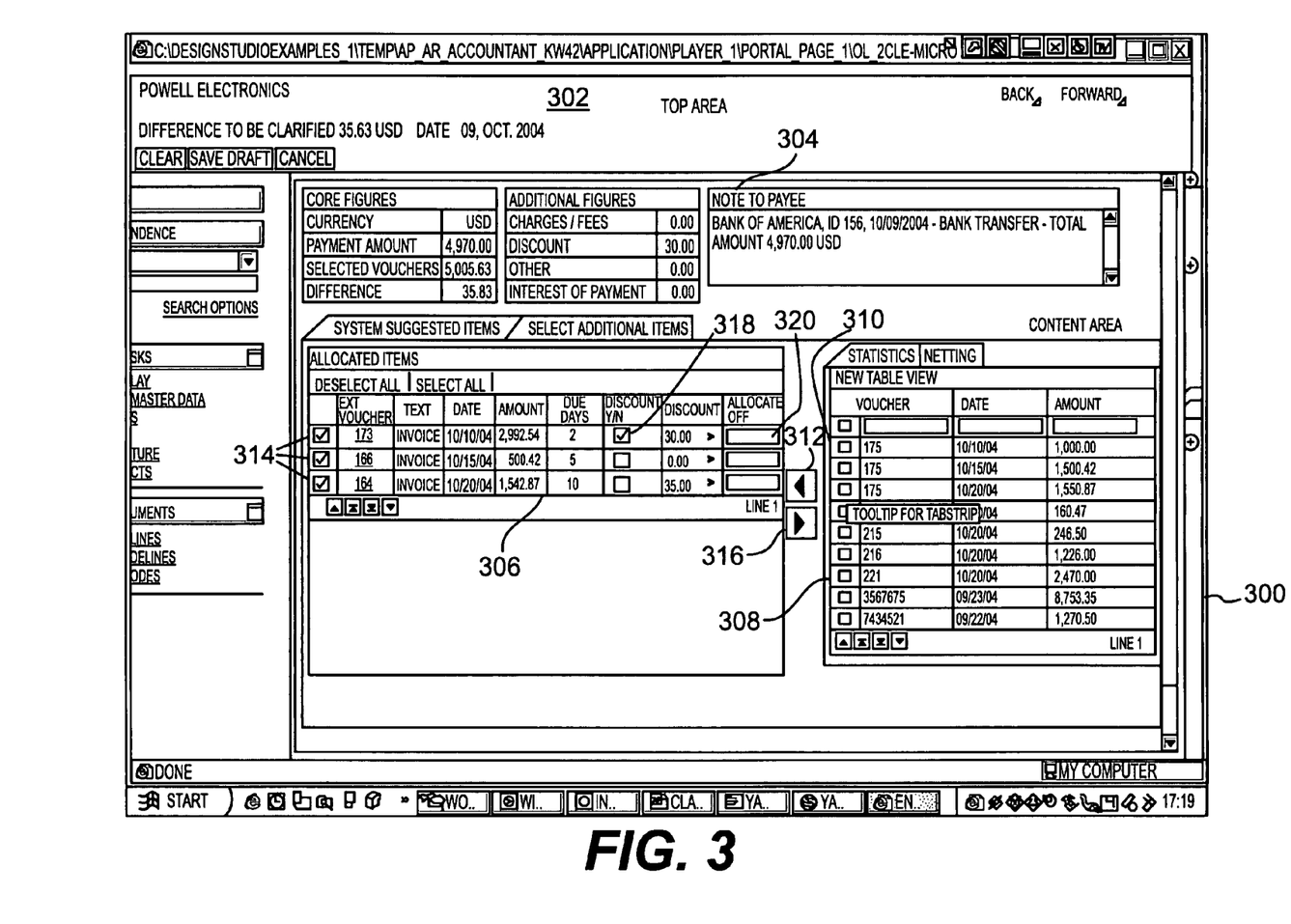
FIG. 3 is an exemplary clearing interface for allowing the user to select vouchers for clearing a payment in accordance with a system consistent with the principles of the present invention.

When interface 300 is first displayed, table 306 may display those system-suggested vouchers that the user has selected, for example, using a radio button associated with those vouchers in table 218 of FIG. 2. The user may use this function to select the closest system-suggested combination of vouchers from which to build a customized combination. Each of the vouchers in table 306 may be displayed with its various attributes in a similar fashion to the display in table 218 of FIG. 2. Table 308 may display a collection of other available vouchers that the user may allocated to balance the payment. The vouchers of table 308 may be obtained from an appropriate voucher database associated with the financial system or any other suitable storage of such data. The user may add a voucher from table 308 to the allocated combination of vouchers in table 306 by, for example, first selecting the voucher using a checkbox 310 associated with the voucher in table 308 and then moving the voucher to table 306 using arrow button 312. When the new voucher is added to table 306, the summary information displayed in summary portion 304, including voucher amount and difference, may be automatically calculated and updated to reflect the current allocation. The user may additionally remove a voucher from table 306 by, for example, selecting the voucher using a checkbox 314 associated with the voucher and then moving the voucher back to table 308 using arrow button 316. Again, the summary data in summary portion 304 may be updated to reflect the changes.

It will be understood that interface 300 is merely illustrative of such an interface. Any other suitable interface may be used without departing from the spirit of the present invention.

Figure 4:
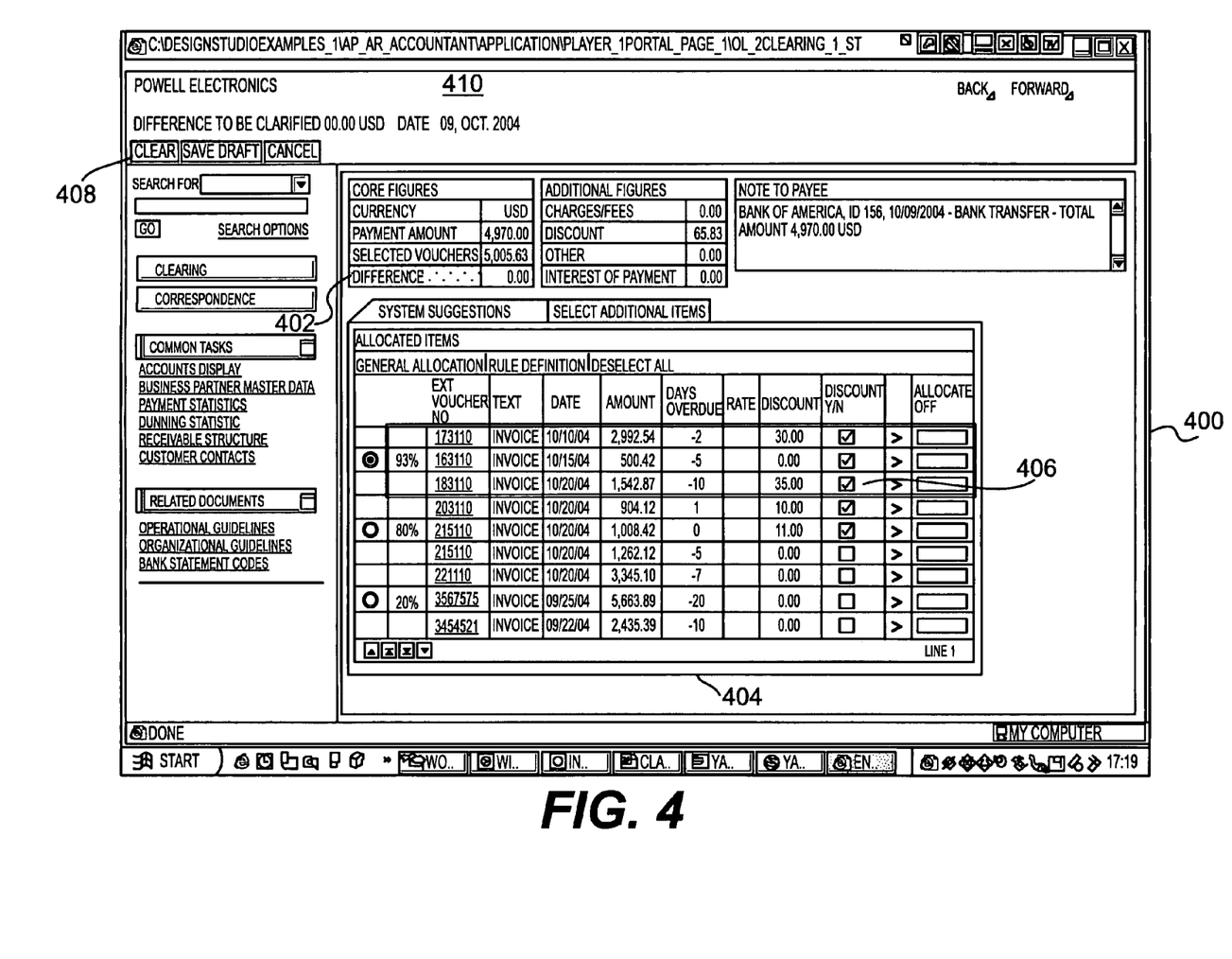
FIG. 4 is an exemplary clearing interface in which a zero difference between payment and its corresponding vouchers are displayed in accordance with a system consistent with the principles of the present invention.

At any point during the manipulation of the various vouchers in interfaces 200 and 300, if a zero difference is achieved, as shown in difference field 402 of FIG. 4, the payment may be ready for clearance. As mentioned above, when the difference becomes zero, the display characteristics associated with difference 402 may change, for example, from red to green. A quick comparison of table 218 of FIG. 2 and table 404 reveals that, in the present example, the zero difference was achieved through approval of a discount 406 associated with one of the vouchers.

At this point in the present example, clearing button 408 may become enabled to allow the user to clear the payment. When the user selects button 408, the payment as identified by the information in top area 410 may be erased from table 102 of FIG. 1.

It will be understood that FIG. 4 is merely illustrative of such an interface. Any other suitable interface may be used without departing from the spirit of the present invention.

Figure 5:
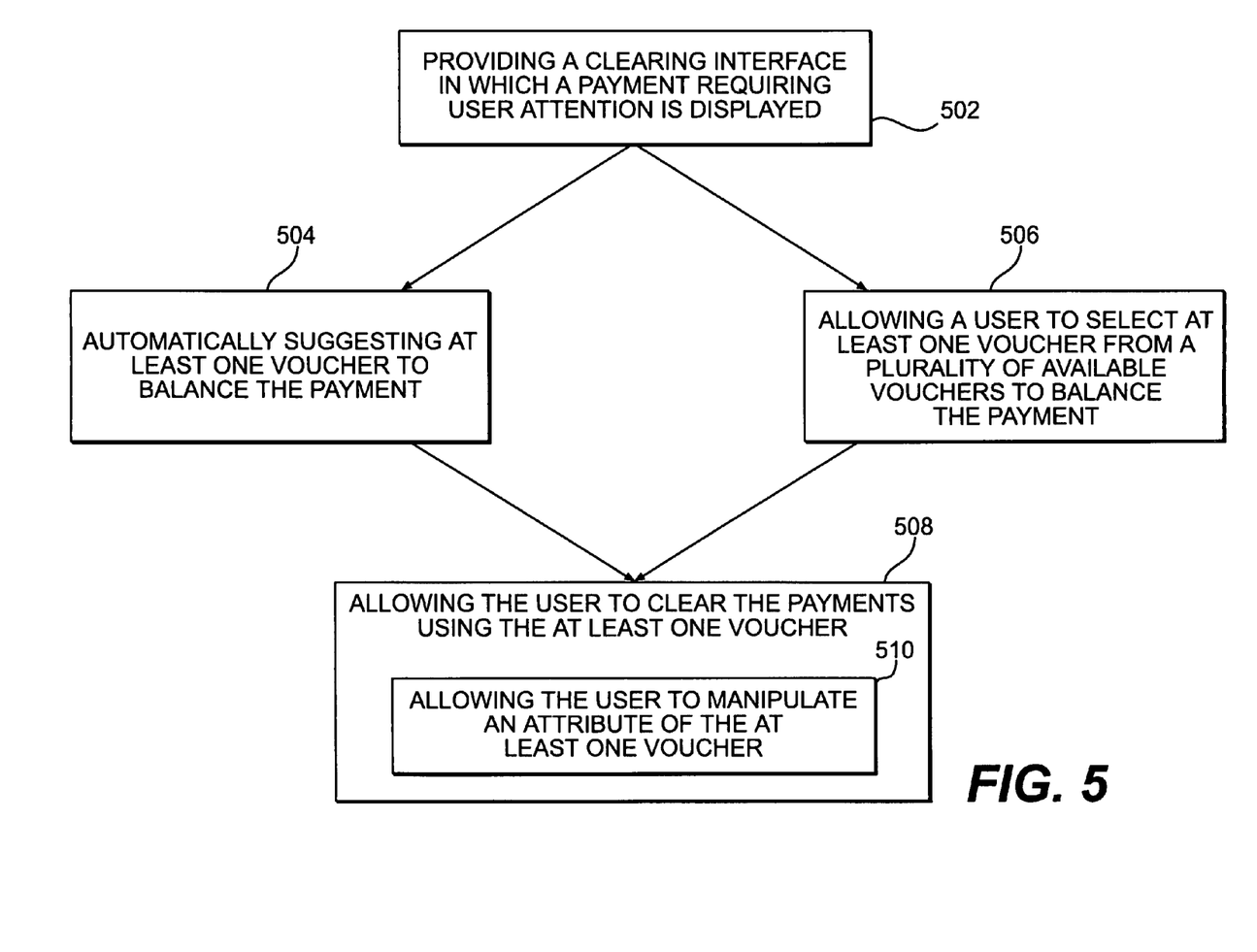
FIG. 5 is a flow chart of illustrative stages involved in assisting the user in clearing a payment against vouchers in a financial system consistent with the principles of the present invention.

FIG. 5 is a flow chart of illustrative stages involved in assisting the user to clear a payment against vouchers in a financial system consistent with the principles of the present invention. At stage 502, a clearing interface may be provided in which a payment requiring user attention is displayed. The displayed payment may be a received banker transfer, check, or any other suitable payment, which the financial system was unable to automatically clear without user input, for example, due to difficulties in locating appropriate vouchers to balance out the payment.

At stage 504, the financial system may automatically suggest at least one voucher to balance the payment in the interface. The financial system may make such a suggestion, for example, based on a set of predefined rules. The system suggestion may include one or more combinations of vouchers as shown, for example, in interface 200 of FIG. 2. The user may, for example, switch among the various suggested combinations, as described in connection with FIG. 2, in an attempt to find the best combination of vouchers to balance out the payment.

Alternative to or in combination with stage 504, the user may select at least one voucher from a plurality of available vouchers to balance the payment in the interface at stage 506. Interface 300 of FIG. 3 exemplifies one suitable arrangement for carrying out stage 506. The plurality of available vouchers from which the user may select may include any voucher that the financial system has determined as being suitable for balancing the present payment or any other suitable selection of vouchers. If used in combination with stage 504, the user may select one or more vouchers from the plurality of available vouchers to add to a combination of system-suggested vouchers. The user may also remove any system-suggested voucher and place it back with the plurality of available vouchers.

Regardless of whether the at least one voucher is system-suggested or user selected from the plurality of available vouchers, the financial system may allow the user to clear the payment using the at least one voucher at stage 508. Stage 508 may additionally include the stage of allowing the user to manipulate an attribute of the at least one voucher from stages 504 and 506. As shown in interfaces 200 and 300 of FIGS. 2 and 3, each voucher, be it system-suggested or user selected, may include various attributes, including, for example, associated discounts. The user, while attempting to balance the payment amount, may approve a discount associated with a voucher, for example, using checkboxes 236 of FIG. 2 or 318 of FIG. 3. The user may also allocate differences associated with a particular voucher, for example, using input fields 238 or 320 associated with the voucher.

The payment may be cleared against the at least one voucher, for example, when user manipulation of the at least one voucher results in a zero balance when the payment is offset by the at least one vouchers. As described in connection with FIG. 4, such an achievement may be indicated by a changed appearance of balance 402 and may lead to the enablement of clear button 408 or any other suitable means for causing clearance of the payment. The user may use clear button 408 or another suitable means to clear the payment at stage 508.

It will be understood that FIG. 5 is merely illustrative of stages involved in assisting the user in clearing a received payment against vouchers in a financial system consistent with the principles of the present invention. Each of the stages is merely a summary of the functionalities that are provided by the financial system, which are illustrated in the exemplary interfaces of FIGS. 1-3. Stages may be added, removed, or modified without departing from the spirit of the present invention.

A computer system may be used to install a software application implementing a financial system consistent with the principles of the present invention. The computer system may be a computer network, as shown in FIG. 6, or a stand-alone personal computer (PC), as shown in FIG. 7.

Figure 6:
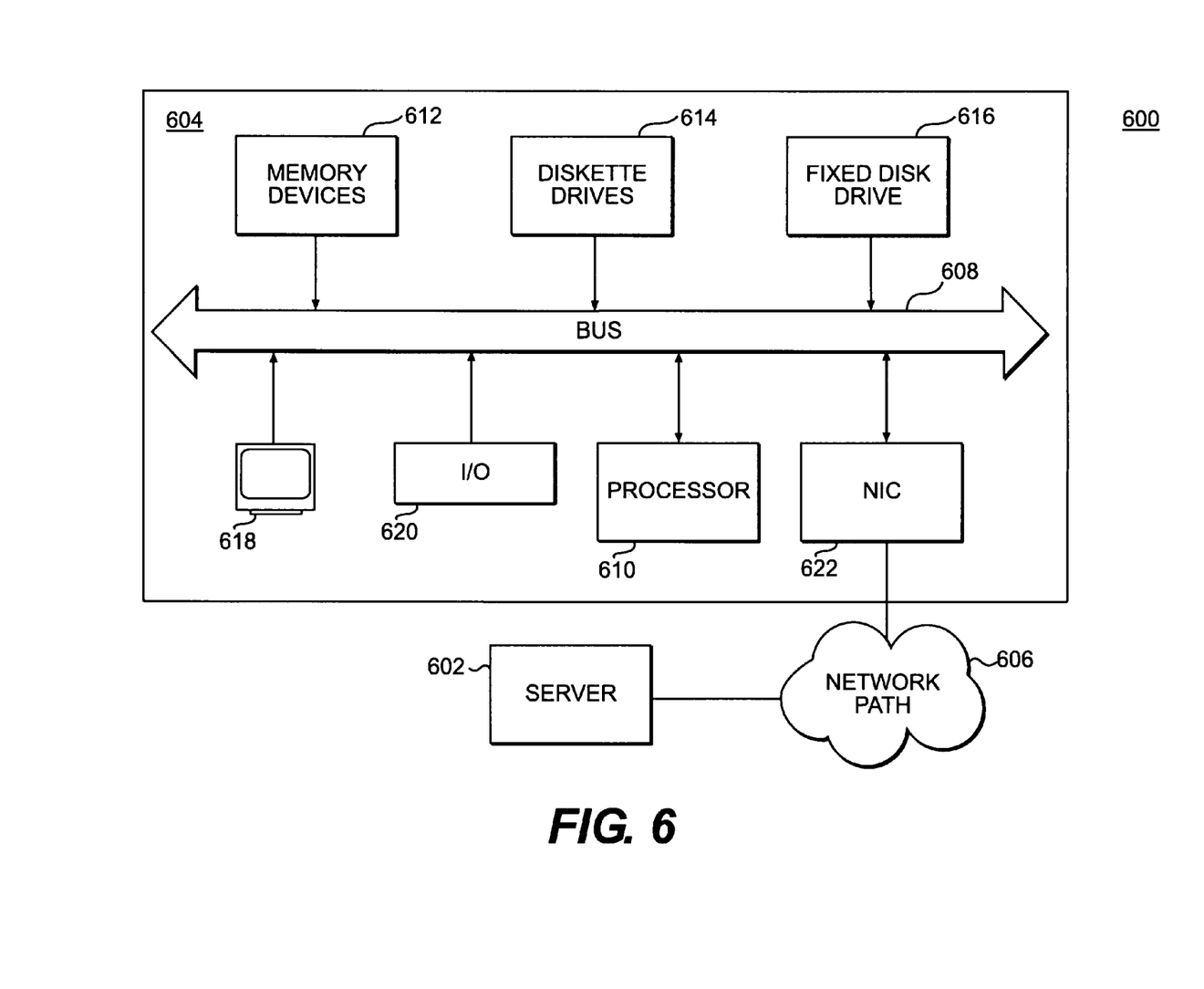
FIG. 6 illustrates a computer system for implementing a software application in accordance with a system consistent with the principles of the present invention.
Figure 7:
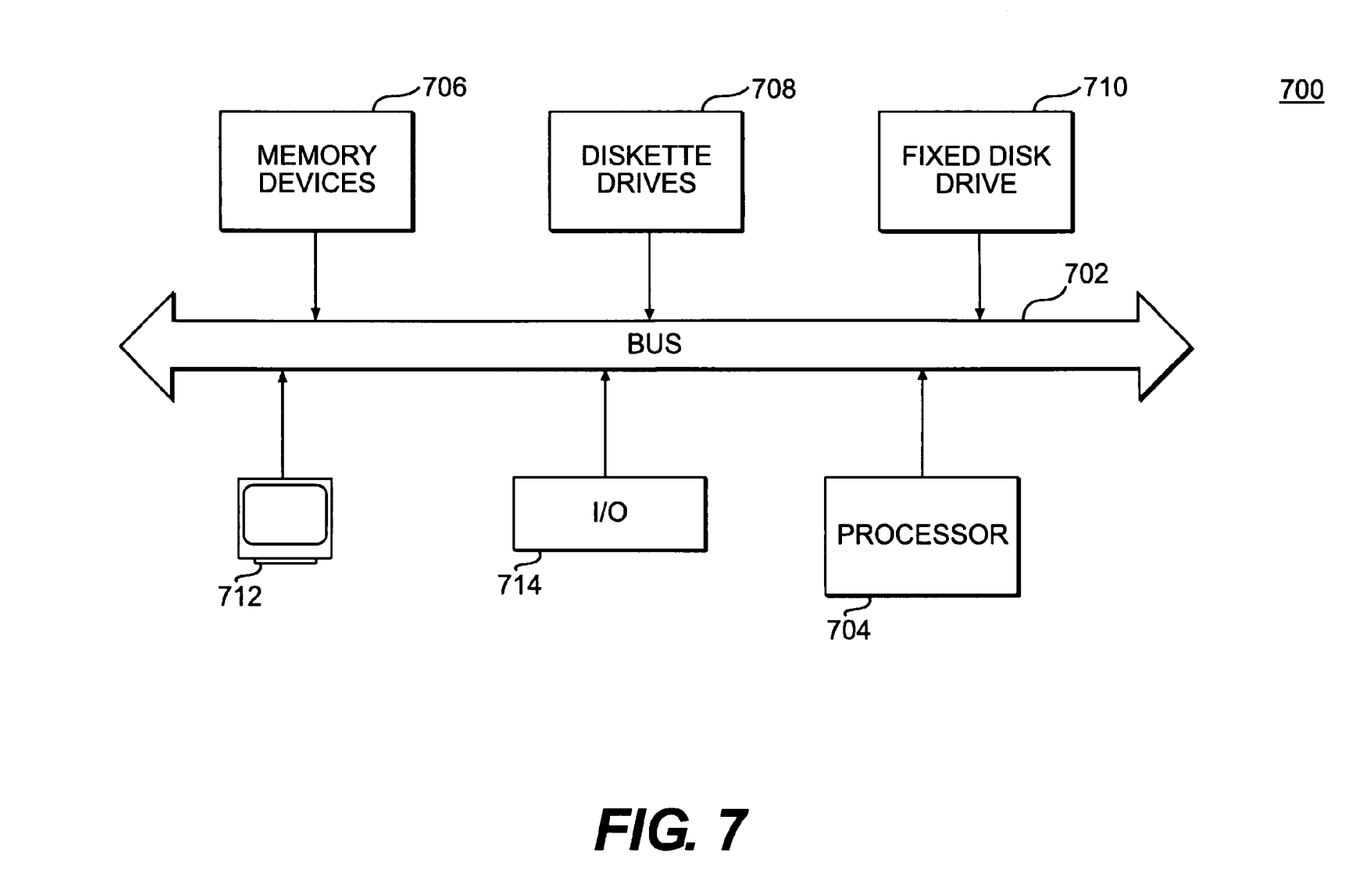
FIG. 7 illustrates another computer system for implementing a software application in accordance with a system consistent with the principles of the present invention.

As shown in FIG. 6, a computer network 600 may include a server 602 and a stand-alone PC 604 connected through a network path 606. Computer network 600 may be a local area network (LAN), where server 602 and PC 604 are workstations. Computer network 600 may also be the Internet, with server 602 hosting a web application and PC 604 being any workstation available to a user desiring to interface with the application on server 602. Alternatively, computer network 600 may be a wide area network (WAN), and server 602 and PC 604 may lie in two separate LANs connected through the Internet.

PC 604 may include a bus line 608 connecting a plurality of devices such as a processor 610, memory devices 612 for storage of information, diskette drives 614, a fixed disk drive 616, a monitor or display 618, other I/O devices 620, and a network interface card (NIC) 622. Processor 610 may be a microprocessor such as an Intel Pentium™ chip for processing applications. Memory devices 612 may include read-only memories (ROM) and/or random access memories (RAM). Diskette drives 614 may include a floppy drive and/or a compact disk (CD) drive. Fixed disk drive 616 may be a hard drive. I/O devices 620 may include a keyboard and/or a mouse for receiving input from a user of PC 604. Monitor or display 618 may display output from processor 610, and may also echo the input of the user. PC 604 may be connected to network path 606 through NIC 622.

A web application may be installed on server 602. An individual desiring to enter data into the application on server 602 may use a web browser loaded on PC 604, and may communicate with server 602 through NIC 622 and network path 606. In one aspect, software application for implementing a system consistent with the principles of the present invention may be stored in PC 604 and processor 610 of PC 604 may execute the software application locally within PC 604 and interface with a web application on server 602. Particularly, the software application may be stored on a floppy disk, a CD, or any other suitable readable media, which may be accessible by diskette drive 614, fixed disk drive 616, or any other suitable mechanism. In another aspect, the software application for implementing a system consistent with the principles of the present invention may be stored in server 602, which may execute the software application, and processor 610 of PC 604 may communicate with server 602 to send information to server 602 and retrieve the results of the execution of the software application from server 602.

Through the execution of the software application implementing a system consistent with the principles of the present invention, either locally within PC 604 or remotely within server 602, interfaces such as those illustrated in FIGS. 1-4 may be provided.

Alternatively, as shown in FIG. 7, a stand-alone PC 700 may be used for implementing a software application implementing a system consistent with the principles of the present invention. PC 700 may include a bus line 702 connecting a plurality of devices, which may include a processor 704, memory devices 706 for storage of information, diskette drives 708, a fixed disk drive 710, a monitor or display 712, and other I/O devices 714. Processor 704 may be a microprocessor such as an Intel Pentium™ chip for processing applications. Memory devices 706 may include ROM and/or RAM. Diskette drives 708 may include a floppy drive and/or a compact disk (CD) drive. Fixed disk drive 710 may be a hard drive. Monitor or display 712 may display the output of processor 704 and may also echo the input of the user. I/O devices 714 may include a keyboard and/or a mouse for receiving input from a user of PC 700.

A software application implementing a system consistent with the principles of the present invention may be stored on a floppy disk or a CD accessible by diskette drive 708 or on fixed disk drive 710. Processor 704 may execute the software application stored in the floppy disk the CD or the fixed disk drive 710. An individual, through monitor or display 712 and I/O devices 714, may interact with processor 704, which may execute the software application. A software application implementing a system consistent with the principles of the present invention may be written in any number of programming languages, including but not limited to JavaScript, Visual Basic, Flash, ABAP coding, or any other suitable language. Similarly, the present invention is not limited to use with certain applications, Internet browsers or operating systems.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A computer implemented method for assisting a user to clear payments against vouchers in a financial system, the method comprising:

providing a graphical user interface on a computer, in which a payment lacking a match with one or more vouchers and requiring user attention is displayed;

automatically creating, in the interface, multiple combinations of vouchers, wherein each of the combinations of vouchers collectively approximates the payment; and allowing a user to select and modify, in the interface, at least one of the combinations of vouchers to clear the payment.

2. The method of claim 1 further comprising:
allowing the user to switch among the combination of vouchers in the interface; and
displaying a difference between the payment and the combination of vouchers in the interface.

3. The method of claim 2 further comprising varying display characteristics associated with the difference to indicate whether the difference has reached zero.

4. The method of claim 1 further comprising allowing the user to select at least one voucher from a plurality of available vouchers to balance the payment in the interface.

5. The method of claim 1 further comprising allowing the user to manipulate an attribute of the combination of vouchers in the interface.

6. The method of claim 5, wherein allowing the user to manipulate the attribute of the combination of vouchers comprises allowing the user to change an attribute that affects the amount associated with the combination of vouchers.

7. The method of claim 1, wherein allowing the user to clear the payment comprises:
determining a difference between the payment and the combination of vouchers;
allowing the user to clear the payment using the combination of vouchers if the difference is zero; and
preventing the user from clearing the payment using the combination of vouchers if the difference is not zero.

8. A system for assisting a user to clear payments against vouchers, the system comprising:
an input-output device;
a display; and
a processor configured to;
provide a graphical user interface on a computer on the display in which a payment lacking a match with one or more vouchers and requiring user attention is displayed;
automatically creating, in the interface, multiple combinations of vouchers, wherein each of the combinations of vouchers collectively approximates the payment; and
allowing a user to select and modify, in the interface, at least one of the combinations of vouchers to clear the payment.

9. The system of claim 8, wherein the processor is further configured to:
allow the user to switch among the combination of vouchers in the interface using the input-output device; and
display a difference between the payment and the combination of vouchers in the interface.

10. The system of claim 9, wherein the processor is further configured to vary display characteristics associated with the difference to indicate whether the difference has reached zero.

11. The system of claim 8, wherein the processor is further configured to allow the user to select at least one voucher from a plurality of available vouchers to balance the payment in the interface.

12. The system of claim 8, wherein the processor is further configured to allow the user to manipulate an attribute of the combination of vouchers in the interface.

13. The system of claim 12, wherein the processor is further configured to allow the user to change an attribute that affects the amount associated with the combination of vouchers.

14. The system of claim 8, wherein the processor is further configured to:
determine a difference between the payment and the combination of vouchers;
allow the user to clear the payment using the combination of vouchers if the difference is zero; and
prevent the user from clearing the payment using the combination of vouchers if the difference is not zero.

15. A computer-readable medium including instructions for performing, when executed by a processor, a method comprising;
providing a graphical user interface on a computer in which a payment lacking a match with one or more vouchers and requiring user attention is displayed;
automatically creating, in the interface, multiple combinations of vouchers, wherein each of the combinations of vouchers collectively approximates the payment; and
allowing a user to select and modify, in the interface, at least one of the combinations of vouchers to clear the payment.

16. The computer-readable medium of claim 15 further includes instructions for:
allowing the user to switch among the combination of vouchers in the interface; and
displaying a difference between the payment and the combination of vouchers in the interface.

17. The computer-readable medium of claim 16 further includes instructions for varying display characteristics associated with the difference to indicate whether the difference has reached zero.

18. The computer-readable medium of claim 15 further includes instructions for allowing the user to select at least one voucher from a plurality of available vouchers to balance the payment in the interface.

19. The computer-readable medium of claim 15 further includes instructions for allowing the user to manipulate an attribute of the combination of vouchers in the interface.

20. The computer-readable medium of claim 15 further includes instructions for allowing the user to change an attribute that affects the amount associated with the combination of vouchers.

21. The computer-readable medium of claim 15 further includes instructions for:
determining a difference between the payment and the combination of vouchers;
allowing the user to clear the payment using the combination of vouchers if the difference is zero; and
preventing the user from clearing the payment using the combination of vouchers if the difference is not zero.

* * * * *

UNITED STATES PATENT AND TRADEMARK OFFICE
CERTIFICATE OF CORRECTION

PATENT NO.       : 7,596,519 B2                                    Page 1 of 1
APPLICATION NO.  : 11/272964
DATED            : September 29, 2009
INVENTOR(S)      : Sander et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this

Twenty-eighth Day of September, 2010

David J. Kappos
*Director of the United States Patent and Trademark Office*